June 26, 1956 S. E. MILLER ET AL 2,751,887
OVERSPEED GOVERNOR WITH SPEED RESPONSIVE SERVOMOTOR
Filed June 1, 1951 6 Sheets-Sheet 1

SIDNEY E. MILLER
CARL H. NYSTROM
INVENTORS

BY Raymond A. Paquin
ATTORNEY

SIDNEY E. MILLER
CARL H. NYSTROM
INVENTORS

BY
ATTORNEY

SIDNEY E. MILLER
CARL H. NYSTROM
INVENTORS

United States Patent Office 2,751,887
Patented June 26, 1956

2,751,887

OVERSPEED GOVERNOR WITH SPEED RESPONSIVE SERVOMOTOR

Sidney E. Miller, Suffield, Conn., and Carl H. Nystrom, West Springfield, Mass., assignors to American Bosch Arma Corporation, a corporation of New York Application June 1, 1951, Serial No. 229,364

11 Claims. (Cl. 121—42)

This invention relates to a new and improved maximum or overspeed governor and has particular reference to such a governor which is adapted primarily for use with turbines or the like for limiting the fuel flow to the nozzles at the top engine speed.

An object of the invention is to provide a new and improved governor of the type set forth which is relatively compact and light weight in construction and therefore adapted for use with aircraft turbines.

Another object is to provide a governor of the type set forth which at top engine speed acts as a speed sensitive by-pass valve and which does not function at all at lower speeds.

Another object of the invention is to provide such a device wherein means is provided to allow the obtaining of desired performance characteristics.

Another object is to provide such a device wherein means is provided for compensating for all variables.

Another object is to provide such a device wherein such compensating means is externally adjustable and wherein a single adjustment may be made for compensating for all variables.

Another object is to provide such a device which is relatively simple in construction and operation.

Other objects and advantages of the invention will be apparent from the following description taken in connection with the accompanying drawings wherein the preferred form of the invention has been shown by way of illustration only.

Referring to the drawings.

Figure 1:
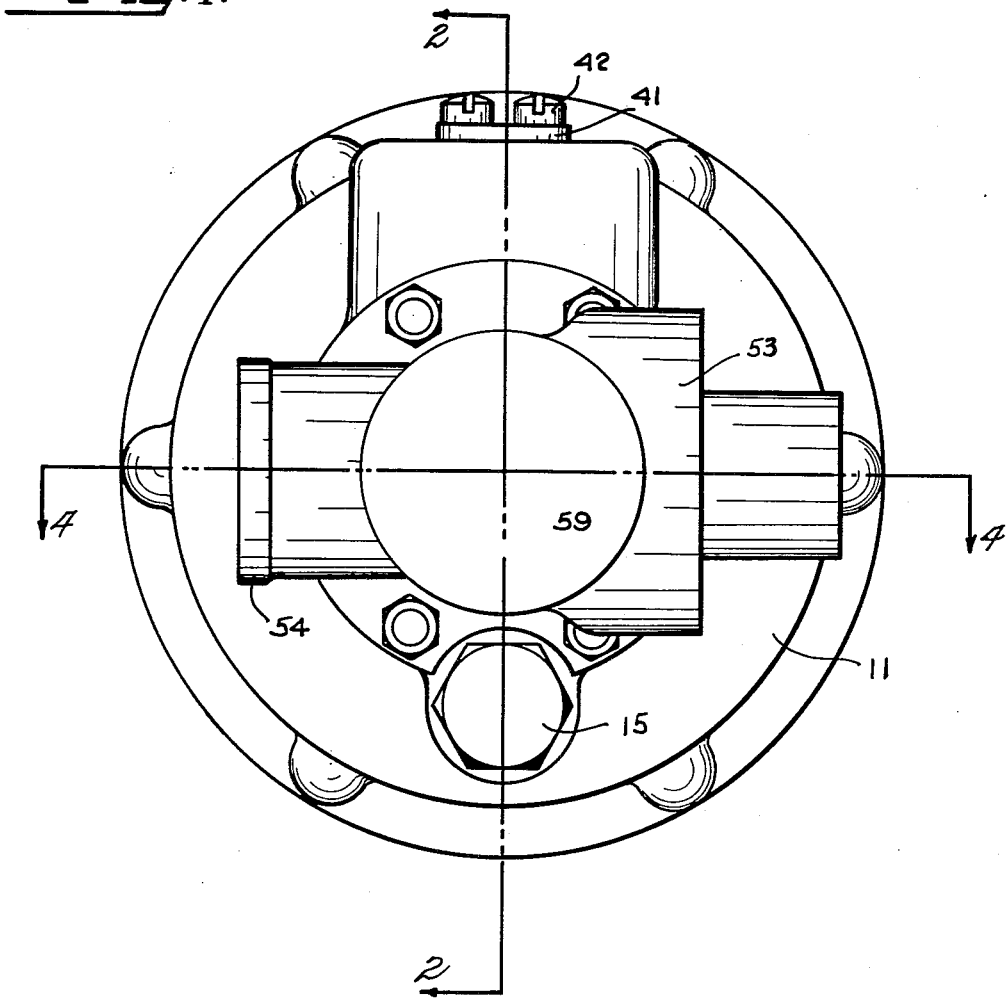
Fig. 1 is a top or end view of an apparatus embodying the invention.

Referring more particularly to the drawings wherein similar reference characters designate corresponding parts throughout, the device shown embodying the invention in Figs. 1 through 4 inclusive comprises a weight housing 10 to which is secured the lever housing 11 by bolts or the like 12 and servo piston housing 13 is secured to lever housing 11 by bolts 14. Spring housing 15 is threaded into the housing 11.

Within weight housing 10 is positioned shaft 17 which is journalled in bearing 18 and sleeve 19 is adapted to be driven by splined driving shaft 20 adapted to be driven by the engine.

Fork 21 is mounted on shaft 20 and is adapted to rotate therewith and carries the centrifugal governor weights 22 which are pivotally mounted on the legs thereof.

Sleeve 19 is mounted for sliding adjustment in sleeve 23 and said sleeve 19 has race 24 of ball bearing 25 fixed thereon and said ball bearing 25 and sleeve 19 are adapted to be axially adjusted by projections 22a on centrifugal weights 22.

Within lever housing 11 is positioned the motion multiplying mechanism which comprises a lever 26 having a projection 27 adapted to engage plate 28 on the end 28a of sleeve 19. Lever 26 which is a double lever arrangement as shown is pivotally mounted about fulcrum 29 and adjacent one end is pivotally connected at 30 to spring rod 31 and adjacent its opposite end is pivotally connected at 32 to bell crank assembly 33 which carries cam follower or roller 34 at one end and is pivotally connected at 35 to actuating rod 36 for pilot valve member 37.

Spring rod 31 extends into spring housing and is provided with governor spring 38 which is adjusted by means of spring adjusting nut 39, as hereinafter described.

Within an opening or recess 40 in lever housing 11 is positioned cam member 41 which is retained in operative relation in said recess 40 by means of screws 42 and said cam lever 41 is provided with cam slot 43 of proper configuration to receive cam roller 34 on the end of bell crank 33 and control the path of movement of said roller and thereby control the action of said motion multiplying arrangement.

Cam member 41 may be inserted into an opening 40 in the side of the housing 11; this allows insertion or replacement of the cam without disturbing the other elements or features of the device.

Actuating rod 36 is threaded into a threaded bore in pilot valve member 37 and locked in adjusted position by lock nut 44 and is adapted to be actuated by bell crank 33 and actuate valve member 37 accordingly.

Pilot valve member 37 is mounted for longitudinal movement in a bore 51 in combined servo piston and valve member 45, which is mounted for longitudinal movement in sleeve 46 in lever housing 11 and in servo piston housing 13.

Combined servo piston and valve member 45 consist of a pair of piston portions 47 and 48 separated by a portion 49 of reduced diameter.

This reduced portion 49 has one or more openings 50 communicating with bore 51 and loose ring 52 surrounds said reduced portion 49 and overlies said opening 50 to eliminate any ram effect of fuel entering said bore 51.

Servo piston housing 13 is provided with fuel inlet 53 and fuel outlet 54 with such inlet and outlet so related that when inlet 53 is closed by piston portion 47 to prevent entrance of fuel, outlet 54 remains partially open to create a pressure drop across the inlet, that is, between the inlet pressure and the pressure in the interior of the bore between pistons 47 and 48.

Piston portion 47 is provided with a suitable number of radial ducts or ports 55 each communicating with its respective vertical hole 56 whereby fuel may pass from bore 57a to the chamber 58 within the space between the end of piston 47 and the end 59 of servo piston housing 13.

Duct or vent 60 is provided for venting the dead end of bore 57 whereby the fuel pressure is eliminated, that is, the pressure at each end of valve 37 is balanced.

Figure 4:
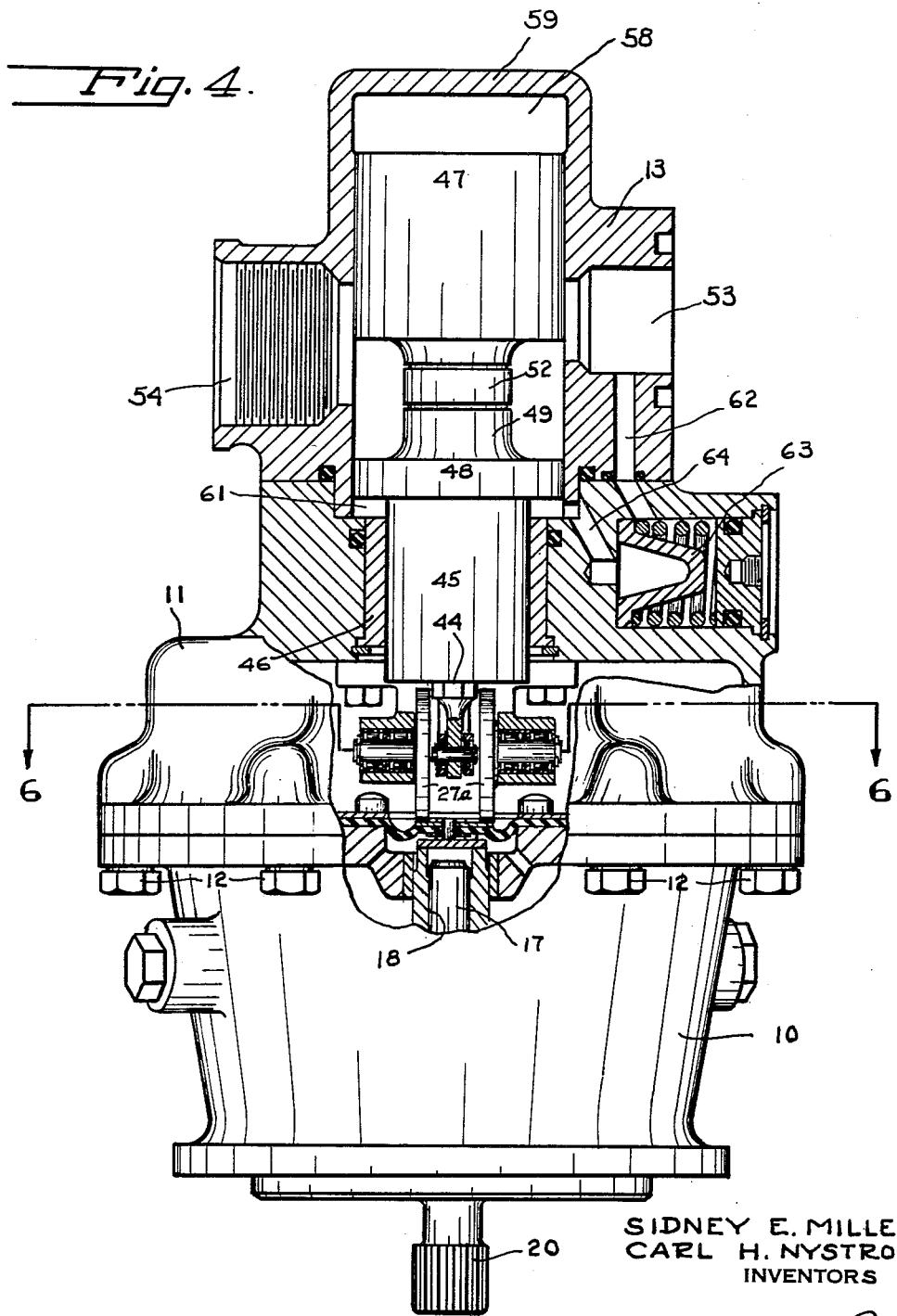
Fig. 4 is a sectional view taken on line 4—4 of Fig. 1, looking in the direction of the arrows.

Annular chamber 61 is provided beneath piston portion 48 for actuating member 45 and is adapted to receive fuel from inlet 53 via duct 62, filter 63 and duct 64 Fig. 4 and serves to move servo piston and valve member 45 in a direction away from lever 26 until fuel passing through duct 65 and annular groove 66 in valve 37 and port 67 and passage 68 in valve 37 to port 69 and annular groove 71 in valve 37 to port 55 when port 55 is moved slightly above land 70 on valve 37 which land is of the same length as the diameter of duct hole 55 and said land normally overlies said duct hole.

This slight opening of duct 55 creates a pressure drop across this slight opening and admits fuel through ducts 55 and 56 to chamber 58 which counteracts the force applied in chamber 61 against piston 48 until the pressure applied against the opposite ends of servo piston and valve member 45 is substantially balanced with the pressure bias in a direction tending to maintain the piston 47 overlying the inlet 53 as shown in Fig. 4. This is the normal operating position of the servo mechanism and it is maintained in this position until the force of the governor weights which is caused by an increase in speed, through the motion multiplying linkage adjusts valve 37 forward thereby moving land 70 to vent chamber 58 to annular groove 71 and hole 50 into the outlet side of the governor which is at substantially lower pressure until land 70 again overlies and closes duct 55 whereupon the piston is in the position shown in Figs. 3 and 4 until the engine speed is reduced thereby causing the weights to collapse and the governor to regain its normal operating position as previously described.

The servo piston and valve 45 and the valve member 37 act in the nature of a follow up servo, that is, they move practically simultaneously.

It will be noted that the pressure area beneath piston 48 is smaller than that on the opposite end of piston 47 which provides the pressure bias for maintaining the normal position.

Figure 2:
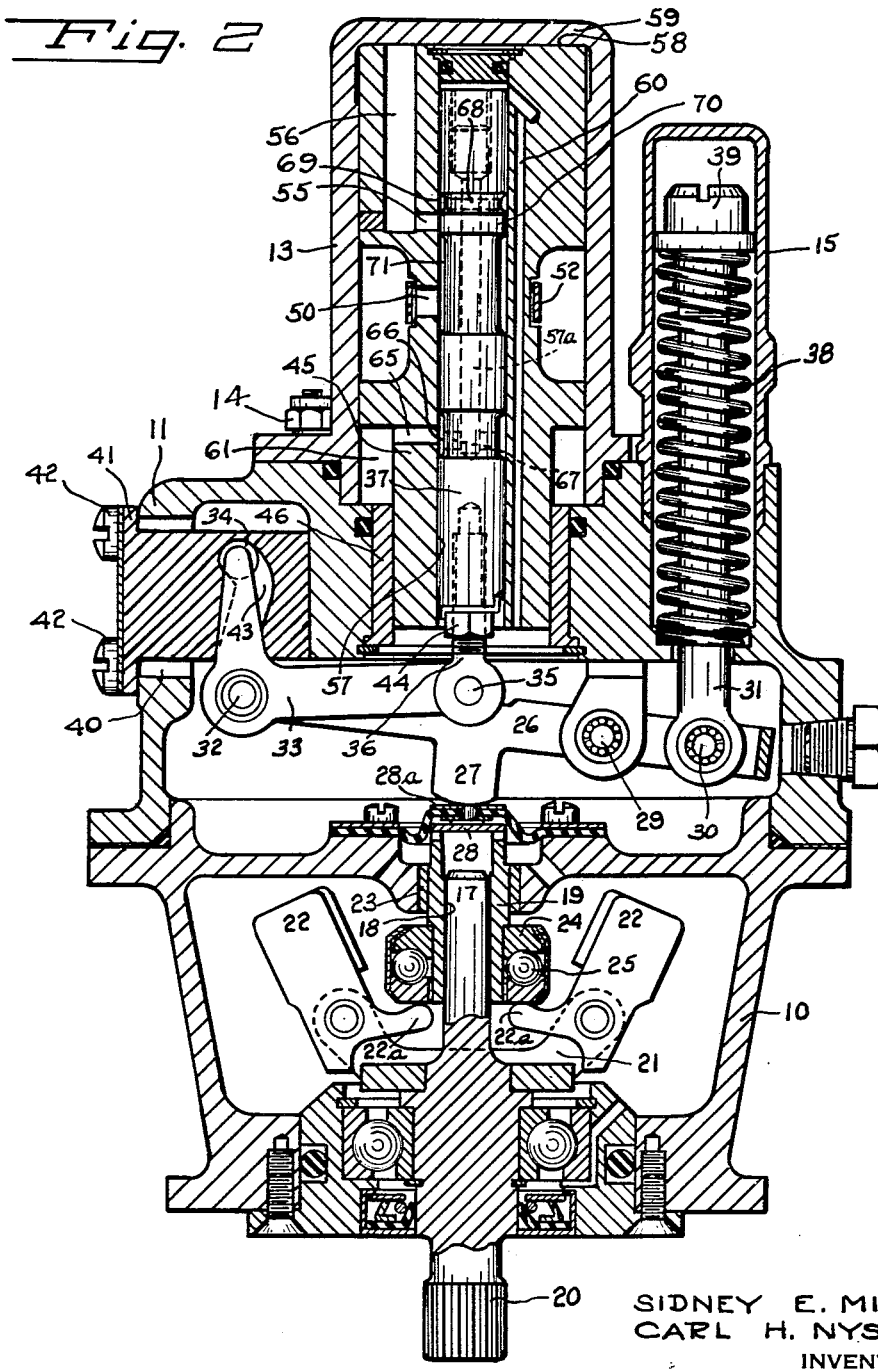
Fig. 2 is a sectional view taken on line 2—2 of Fig. 1, looking in the direction of the arrows.
Figure 3:
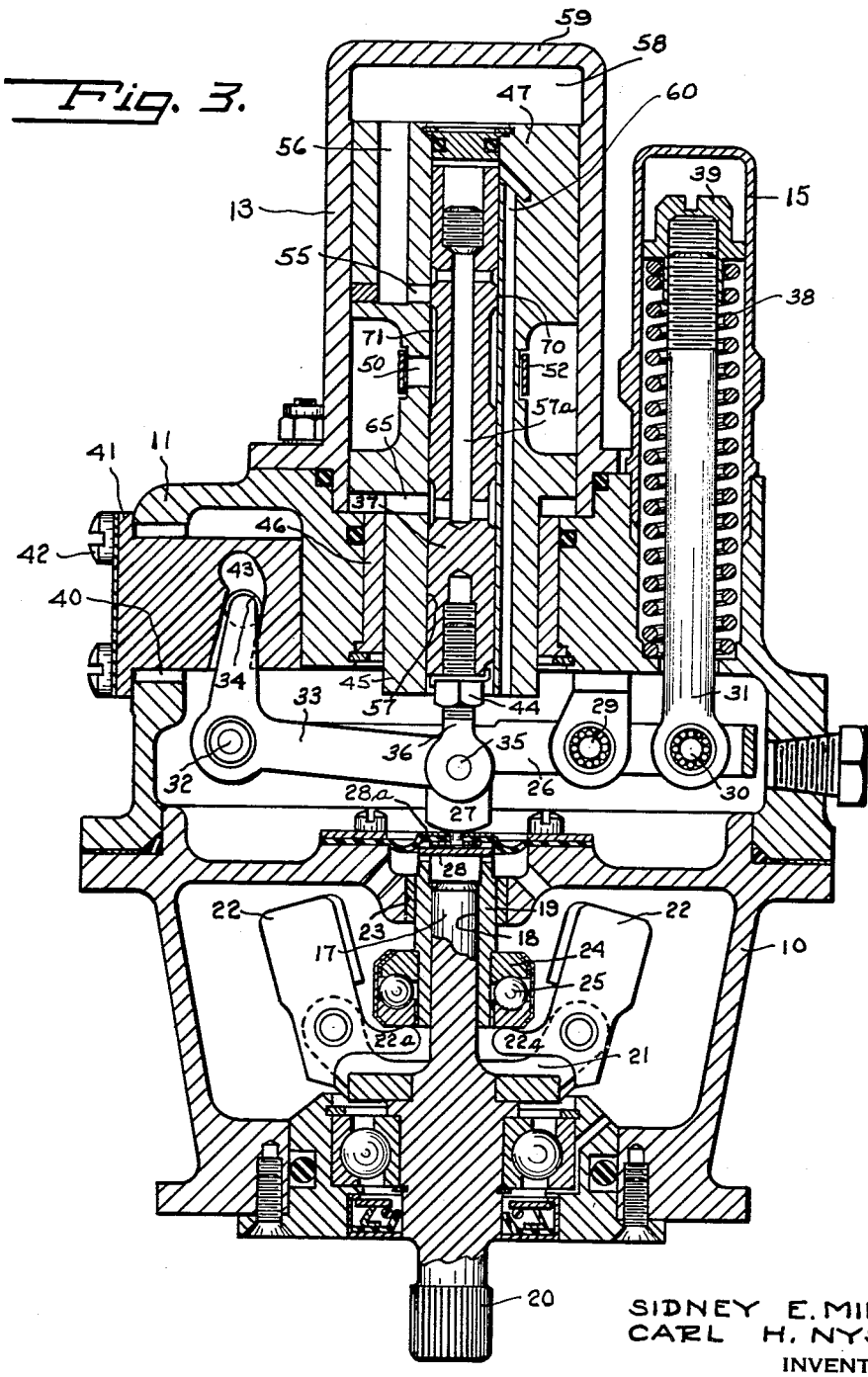
Fig. 3 is a sectional view of the device embodying the invention.

Fig. 3 shows the mechanism in an intermediate position during its functional operation and Fig. 2 shows the mechanism in full bypass position.

Figure 5:
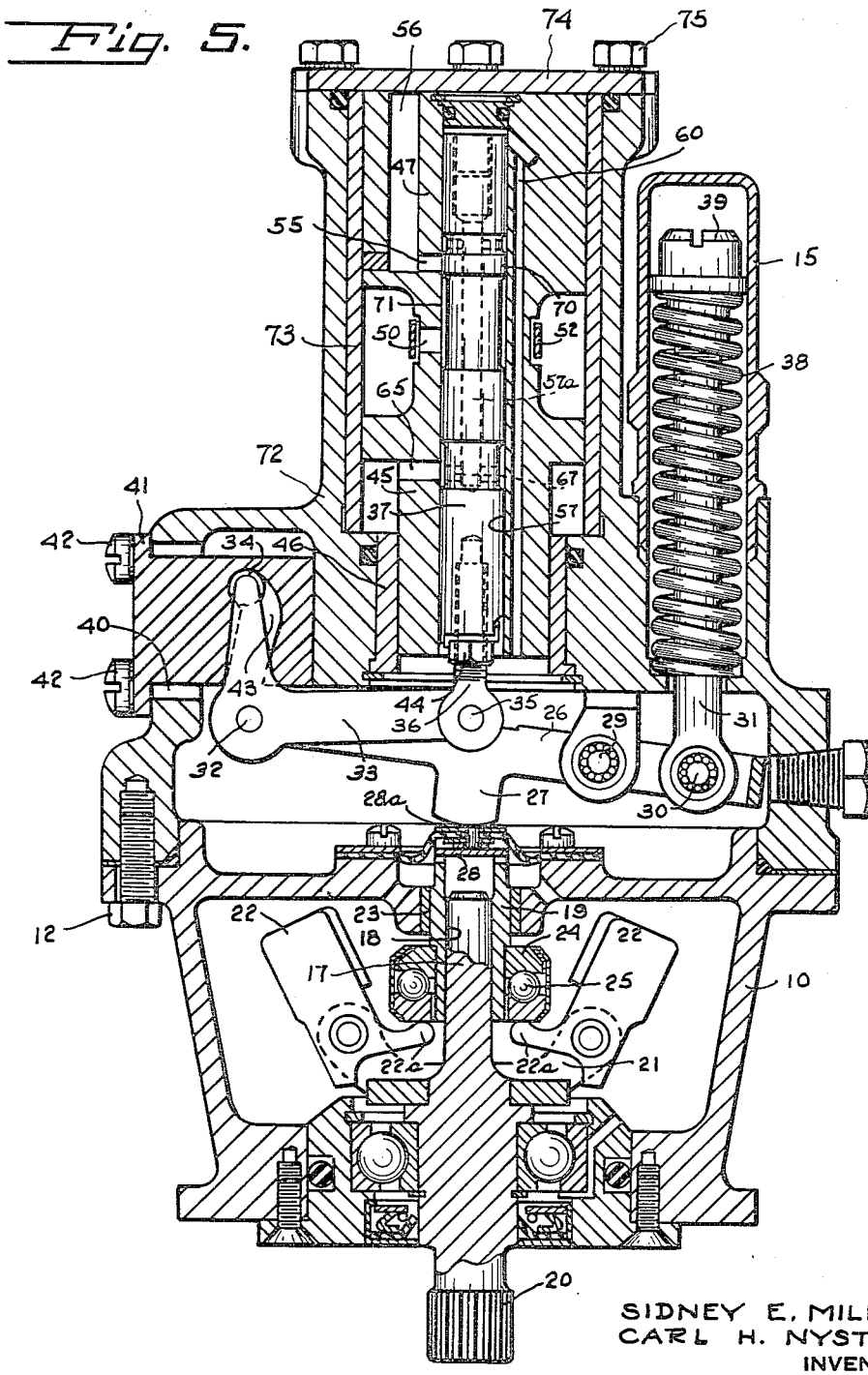
Fig. 5 is a view similar to Fig. 3, but showing another form of the invention.
Figure 6:
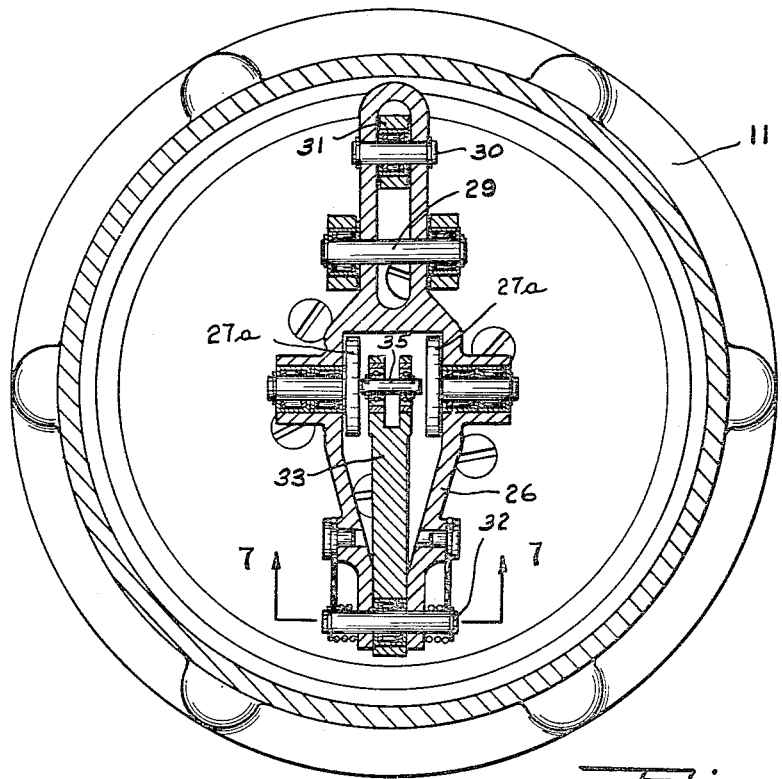
Fig. 6 is a sectional view taken on line 6—6 of Fig. 4, looking in the direction of the arrows.
Figure 7:
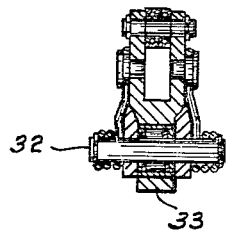
Fig. 7 is a sectional view taken on line 7—7 of Fig. 6.

In Figs. 5 through 7 is shown a slightly modified form of the device wherein the lever housing 11 and servo piston housing 13 are replaced by a composite, one piece housing member 72 of aluminum which housing contains the steel sleeve or liner 73 and the steel end plate 74 which is secured to housing member 72 by means of bolts 75.

Otherwise this construction is similar to that shown in the other figures of the drawing and possesses the advantage of light weight.

In Figs. 4, 6 and 7 which is otherwise similar to the form of the invention shown in Fig. 2, there is shown a modified form of motion multiplying lever system in which the lever 26 comprises a pair of spaced arms having the rollers 27a, one of which is connected to each of the separated arms and springs are provided on the pivot 32 to spring load the lever and bell crank.

The construction is otherwise generally similar to the form of construction shown in Fig. 2.

The operation of the device is believed to be clear from the above description wherein the operation of the various elements of the hydraulic system have been set forth in connection with the description of the elements.

The device is intended to operate as an overspeed governor which at top engine speed acts or operates as a speed-sensitive, by-pass valve and does not function at all at lower speeds.

The normal operating position of the device is as shown in Fig. 2 and the servo mechanism is maintained in this position until the centrifugal action of the governor weights are so affected by an increase of speed of the shaft, that they move outwardly sufficiently to cause sleeve 19 to urge the motion multiplying lever system or linkage system and such lever system, the movement of which is controlled by the cam 43, therefore, multiplies this movement of sleeve 19 and effects such multiplied motion of valve 37 thereby moving land 70 on valve 37 to vent chamber 58 to annular groove 71 and hole 50 into the outlet side of the device which is at substantially lower pressure until land 70 again overlies and closes duct 55 whereupon the servo piston is in the position shown in Figs. 8 and 9 where it remains until the engine speed is reduced thereby causing the weights to collapse and the governor to regain its normal operating position with piston 47 of member 45 overlying and closing inlet 53 and partially closing outlet 54, which is the normal position of such piston and where it remains until actuated by the hydraulic system controlled by valve 37 as previously described.

By adjustment of nut 39 the load of spring 38 on the motion multiplying lever system may be adjusted to a predetermined load to thereby control the action of such lever system.

As previously stated, the servo piston and valve member 45 and the valve member 37 move practically simultaneously in the nature of a follow-up servo mechanism.

In brief, the operation of the device is as follows:

Centrifugal weights 22 on shaft 17 effect sliding movement of the sleeve 19 which pushes lever 27 and pivots said lever about fulcrum 29 and causes the bell crank assembly 33 to move and, thereby, effects movement of pilot valve member 37. However, the movement of the pilot valve member is modified by the cam roller 34 in the cam slot 43. As cam roller 34 is carried by the bell crank 33, which is pivoted at 32, the movement of lever 26 is modified by the bell crank and cam and cam slot to accordingly modify the movement of pilot valve 37. This also multiplies the small essentially linear motion or travel of the governor sleeve to a larger motion of the pilot valve, which motion is non-linear because of the modifying effect of the cam and bell crank arrangement.

From the above it will be seen that we have provided means for obtaining all of the objects and advantages of the invention.

We claim:

1. In a device of the character described, a housing having a cylinder, a servo piston member in said cylinder and having a bore, a control valve within said bore, a speed sensitive mechanism for controlling said valve and a motion multiplying system between said valve and speed sensitive mechanism, said motion multiplying mechanism comprising a spring loaded pivoted lever operatively connected to said speed sensitive mechanism and a cam controlled bell crank member pivotally connected to said lever and connected to said control valve for changing the rate of motion of said pilot valve relative to said speed sensitive mechanism.

2. In a device of the character described, a housing having a cylinder, a longitudinally movable servo piston member in said cylinder and having a pair of spaced piston portions and having a bore, a port between said piston portions and communicating with said bore, port means communicating said bore on the outer sides of the ends of each of said piston portions, a pilot control valve in said bore, said pilot control valve having a duct communicating with said ports on the outer ends of said piston portions and centrifugally actuated speed sensitive means for actuating said control valve in said bore, motion multiplying means between said control valve and said centrifugally actuated means and means for changing the rate of motion of said pilot valve relative to said speed sensitive means, said means comprising a cam, a lever operatively connected to and actuated by said speed sensitive means, and a cam follower connected to said lever and to said pilot valve.

3. In a device of the character described, a housing having a cylinder, a longitudinally movable servo piston member in said cylinder and having a pair of spaced piston portions and having a bore, a port between said piston portions and communicating with said bore, port means communicating with said bore on the outer sides of the ends of each of said piston portions, a pilot control valve in said bore, said pilot control valve having a duct communicating with said ports on the outer ends of said piston portions and centrifugally actuated speed sensitive means for actuating said control valve in said bore and cam controlled means connecting said control valve and said centrifugally actuated means for changing the rate of motion of said pilot valve relative to said speed sensitive means and comprising a cam, a lever operatively connected to and actuated by said speed sensitive means, and a cam follower connected to said lever and to said pilot valve.

4. In a device of the character described, a housing having a cylinder, a longitudinally movable servo piston member in said cylinder and having a pair of spaced piston portions and having a bore, a port between said piston portions and communicating with said bore, port means communicating with said bore on the outer sides of the ends of each of said piston portions, a pilot control valve in said bore, said pilot control valve having a duct communicating with said ports on the outer ends of said piston portions and centrifugally actuated speed sensitive means for actuating said control valve in said bore and cam controlled motion multiplying means connecting said control valve and said centrifugally actuated means for changing the rate of motion of said pilot valve relative to said speed sensative means and comprising a cam, a lever operatively connected to and actuated by said speed sensitive means, and a cam follower connected to said lever and to said pilot valve.

5. In a device of the character described, a housing having a cylinder, a longitudinally movable servo piston member in said cylinder and having a pair of spaced piston portions and having a bore, a port between said piston portions and communicating with said bore, port means communicating with said bore on the outer sides of the ends of each of said piston portions, a pilot control valve in said bore, said pilot control valve having a duct communicating with said ports on the outer ends of said piston portions and centrifugally actuated means for actuating said pilot control valve in said bore and motion multiplying means between said pilot control valve and said centrifugally actuated means, said motion multiplying means comprising a spring loaded pivoted lever, means for varying the rate of motion multiplication obtained from said motion multiplying system, said means for varying the rate of multiplication of said motion multiplying means comprising a cam controlled bell crank member connected to said lever and said valve for changing the rate of motion of said pilot valve relative to said speed sensitive means and comprising a cam, a lever operatively connected to and actuated by said speed sensitive means, and a cam follower connected to said lever and to said pilot valve.

6. In a device of the character described, a housing having a cylinder, a longitudinally movable servo piston member in said cylinder and having a pair of spaced piston portions and having a bore, a port between said piston portions and communicating with said bore, port means communicating with said bore on the outer sides of the ends of each of said piston portions, a pilot control valve in said bore, said pilot control valve having a duct communicating with said ports on the outer ends of said piston portions and centrifugally actuated means for actuating said pilot control valve in said bore and cam controlled motion multiplying means connecting said pilot control valve and said centrifugally actuated means, said motion multiplying means comprising a spring loaded pivoted lever, means for varying the rate of motion multiplication obtained from said motion multiplying system, said means for varying the rate of multiplication of said motion multiplying means comprising a cam controlled bell crank member connected to said lever and said valve for changing the rate of motion of said pilot valve relative to said speed sensitive means and comprising a cam, a lever operatively connected to and actuated by said speed sensitive means, and a cam follower connected to said lever and to said pilot valve.

7. In a device of the character described, a housing having a cylinder, a longitudinally movable servo piston member in said cylinder and having a pair of spaced piston portions and having a bore, a port between said piston portions and communicating with said bore, port means communicating with said bore on the outer sides of the ends of each of said piston portions, a pilot control valve in said bore, said pilot control valve having a duct communicating with said ports on the outer ends of said piston portions and centrifugally actuated speed sensitive means for actuating said pilot control valve in said bore, motion multiplying means between said pilot control valve and said centrifugally actuated means, spring means for preloading said motion multiplying means for changing the rate of motion of said pilot valve relative to said speed sensitive means and comprising a cam, a lever operatively connected to and actuated by said speed sensitive means, and a cam follower connected to said lever and to said pilot valve.

8. An overspeed governor, comprising a housing having a cylinder and a servo piston member in said cylinder for controlling the quantity of fuel bypassed, said servo piston member having a bore and a pilot valve in said bore, a speed sensitive mechanism operatively connected to said pilot valve, a motion multiplying system between the pilot valve and the speed sensitive mechanism, and means for varying the rate of motion multiplication obtained from the motion multiplying system comprising a lever operatively connected to said speed sensitive mechanism, a cam for changing the relative rate of motion of said pilot valve relative to said speed sensitive mechanism and a cam follower engaging said cam and connected to said pilot valve and lever.

9. An overspeed governor, comprising a housing having a cylinder and a servo piston member in said cylinder for controlling the quantity of fuel bypassed, said servo piston member having a bore and a pilot valve in said bore, a speed sensitive mechanism operatively connected to said pilot valve, a centrifugally actuated motion multiplying system between the pilot valve and the speed sensitive mechanism, and means for varying the rate of motion multiplication obtained from the motion multiplying system comprising a lever operatively connected to said speed sensitive mechanism, a cam for changing the relative rate of motion of said pilot valve relative to said speed sensitive mechanism and a cam follower engaging said cam and connected to said pilot valve and lever.

10. An overspeed governor, comprising a housing having a cylinder and a servo piston member in said cylinder for controlling the quantity of fuel bypassed, said servo piston member having a bore and a pilot valve in said bore, a speed sensitive mechanism operatively connected to said pilot valve, a motion multiplying system between the pilot valve and the speed sensitive mechanism, and means for varying the rate of motion multiplication obtained from the motion multiplying system comprising a cam for changing the relative rate of motion of said pilot valve relative to said speed sensitive mechanism and a cam follower engaging said cam and connected to said pilot valve, said motion multiplying system comprising a spring loaded pivoted lever operatively connected to said pilot valve and speed sensitive mechanism.

11. An overspeed governor, comprising a housing having a cylinder and a servo piston member in said cylinder for controlling the quantity of fuel bypassed, said servo piston member having a bore and a pilot valve in said bore, a speed sensitive mechanism operatively connected to said pilot valve, a centrifugally actuated motion multiplying system between the pilot valve and the speed sensitive mechanism, and means for varying the rate of motion multiplication obtained from the motion multiplying system comprising a cam for changing the relative rate of motion of said pilot valve relative to said speed sensitive mechanism and a cam follower engaging said cam and connected to said pilot valve, said motion multiplying system comprising a spring loaded pivoted lever operatively connected to said pilot valve and speed sensitive mechanism.

(References on following page)

References Cited in the file of this patent

UNITED STATES PATENTS

| | | |
|---|---|---|
| 567,366 | Thunderbolt | Sept. 8, 1896 |
| 822,887 | Emmet | June 5, 1906 |
| 929,206 | Gelpke et al. | July 27, 1909 |
| 1,125,825 | Englesson | Jan. 19, 1915 |
| 1,404,646 | Prescott | Jan. 24, 1922 |
| 1,743,732 | Seewer | Jan. 14, 1930 |
| 1,825,611 | Bangerter | Sept. 29, 1931 |
| 1,864,850 | Nordberg | June 28, 1932 |
| 2,020,847 | Mitereff | Nov. 12, 1935 |
| 2,035,166 | Kimball | Mar. 24, 1936 |
| 2,106,684 | Ring et al. | Jan. 25, 1938 |
| 2,168,155 | Caughey | Aug. 1, 1939 |
| 2,224,638 | Ring et al. | Dec. 10, 1940 |
| 2,379,945 | Wyatt | July 10, 1945 |
| 2,491,551 | Cross | Dec. 20, 1949 |
| 2,618,244 | Roehm | Nov. 18, 1952 |

FOREIGN PATENTS

| | | |
|---|---|---|
| 151,029 | Switzerland | Feb. 16, 1932 |